US009456306B2

United States Patent
Wang et al.

(10) Patent No.: US 9,456,306 B2
(45) Date of Patent: Sep. 27, 2016

(54) FINE TIMING MEASUREMENT TRANSMISSIONS BETWEEN APS

(71) Applicant: BROADCOM CORPORATION, Irvine, CA (US)

(72) Inventors: Qi Wang, San Francisco, CA (US); Matthew James Fischer, Mountain View, CA (US)

(73) Assignee: BROADCOM CORPORATION, Irvine, CA (US)

( * ) Notice: Subject to any disclaimer, the term of this patent is extended or adjusted under 35 U.S.C. 154(b) by 95 days.

(21) Appl. No.: 14/501,868

(22) Filed: Sep. 30, 2014

(65) Prior Publication Data

US 2015/0094103 A1 Apr. 2, 2015

Related U.S. Application Data

(60) Provisional application No. 61/884,759, filed on Sep. 30, 2013.

(51) Int. Cl.
*H04W 4/02* (2009.01)
*G01S 5/10* (2006.01)
*H04W 52/02* (2009.01)

(52) U.S. Cl.
CPC ............... *H04W 4/023* (2013.01); *G01S 5/10* (2013.01); *H04W 52/0216* (2013.01); *H04W 52/0254* (2013.01); *Y02B 60/50* (2013.01)

(58) Field of Classification Search
CPC ........... H04W 4/023; H04W 52/0254; H04W 52/0216; G01S 5/10; Y02B 60/50
See application file for complete search history.

(56) References Cited

U.S. PATENT DOCUMENTS

| 8,233,457 B1* | 7/2012 | Chen ..................... G01S 13/878 370/332 |
| 9,035,827 B2* | 5/2015 | Marshall ................... G01S 5/00 342/357.31 |
| 2004/0198381 A1* | 10/2004 | Siegel ................... H04W 64/00 455/456.1 |
| 2007/0129086 A1* | 6/2007 | Toone ................... H04W 24/00 455/456.5 |
| 2010/0323723 A1* | 12/2010 | Gerstenberger ...... G01S 5/0226 455/456.5 |

* cited by examiner

*Primary Examiner* — Brandon Miller
(74) *Attorney, Agent, or Firm* — Garlick & Markson; Shayne X. Short

(57) ABSTRACT

A wireless communication device (WDEV) receives, detects, snoops, etc. (generally, "receives") signals that are transmitted between two other WDEVs and extracts information therefrom to determine the location of the WDEV. These signals can include fine timing measurement (FTM) and/or timestamps related information as part of a frame exchange procedure between those two other WDEVs. A new protocol specifies when such an FTM and/or timestamps frame exchange procedure is performed between the two other WDEVs, and the WDEV intelligently detects/receives such signals at such specified times. When the WDEV operates in a reduced power or sleep state, the WDEV awakens from the reduced power or sleep state at the appropriate times to detect FTM and/or timestamps related information of such a frame exchange procedure. The WDEV then can process such FTM and/or timestamps related information for use in determining the location of the WDEV relative to the two other WDEVs.

20 Claims, 10 Drawing Sheets

FIG. 6A  FTM request frame format

FIG. 6B  FTM request frame format

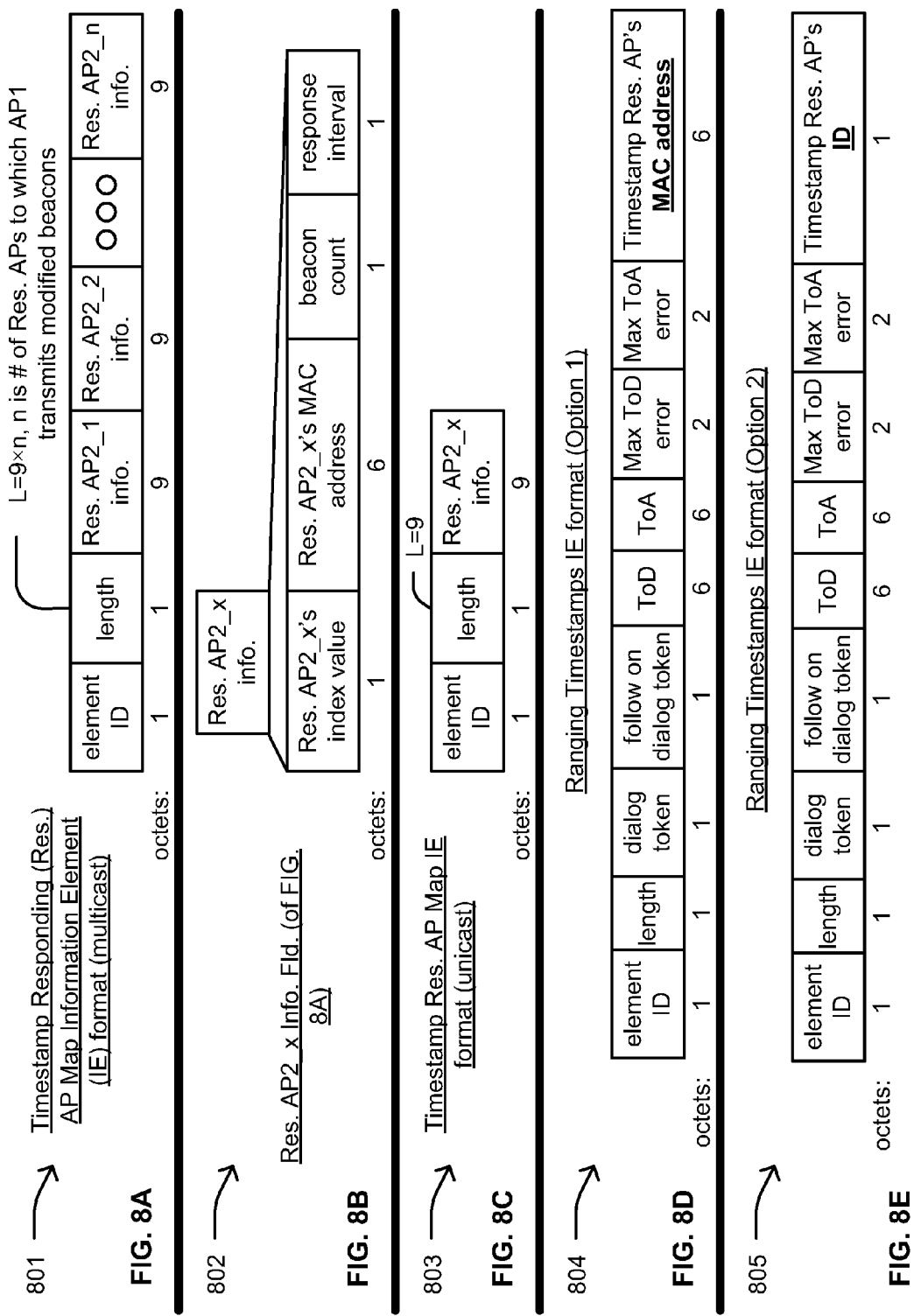

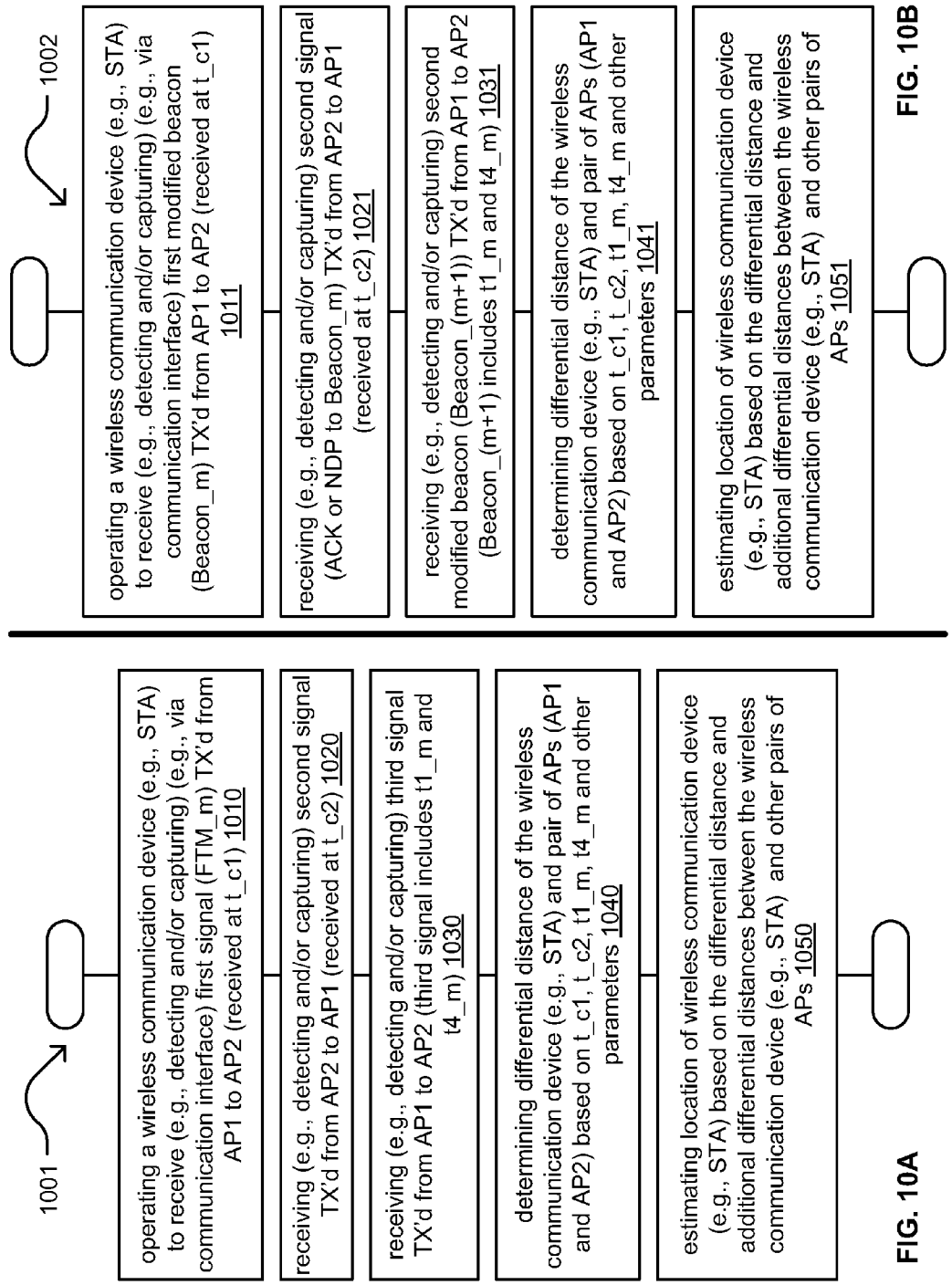

FINE TIMING MEASUREMENT TRANSMISSIONS BETWEEN APS

CROSS REFERENCE TO RELATED PATENTS/PATENT APPLICATIONS

Provisional Priority Claim

The present U.S. Utility Patent Application claims priority pursuant to 35 U.S.C. §119(e) to U.S. Provisional App. Ser. No. 61/884,759, entitled "Fine timing measurement transmissions between APs," filed Sep. 30, 2013, which is hereby incorporated herein by reference in its entirety and made part of the present U.S. Utility Patent Application for all purposes.

BACKGROUND

1. Technical Field

The present disclosure relates generally to communication systems; and, more particularly, to monitoring communications of other wireless communication devices for various purposes within single user, multiple user, multiple access, and/or MIMO wireless communications.

2. Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into radio frequency (RF) signals that are transmitted to a RX that includes two or more antennae and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennae to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

In some situations, it is desirable for a wireless communication device to know its location within a wireless communication system and/or its actual physical location within a vicinity or on earth. While there are certain means in the prior art by which a device may determine its location (e.g., global positioning system (GPS)), there is ample room for improvement in the ways in which devices determine their location. Also, there is also ample room for new solutions by which devices may determine their location. The prior art does not provide solutions and technologies by which all wireless communication devices may operate to determine their location in efficient and accurate ways.

BRIEF DESCRIPTION OF THE SEVERAL VIEWS OF THE DRAWINGS

FIG. 6A is a diagram illustrating an example of an FTM request frame format.

FIG. 6B is a diagram illustrating another example of an FTM request frame format.

FIG. 8A is a diagram illustrating an example format of a timestamp responding AP map information element (IE).

FIG. 8B is a diagram illustrating an example format of a responding AP field that may be used with the IE of FIG. 8A.

FIG. 8C is a diagram illustrating another example format of a timestamp responding AP map IE and specifically for use in unicast communications.

FIG. 8D is a diagram illustrating an example format of a ranging timestamps IE.

FIG. 8E is a diagram illustrating another example format of a ranging timestamps IE.

FIG. 10A is a diagram illustrating an embodiment of a method for execution by one or more wireless communication devices.

FIG. 10B is a diagram illustrating another embodiment of a method for execution by one or more wireless communication devices.

DETAILED DESCRIPTION

Figure 1:
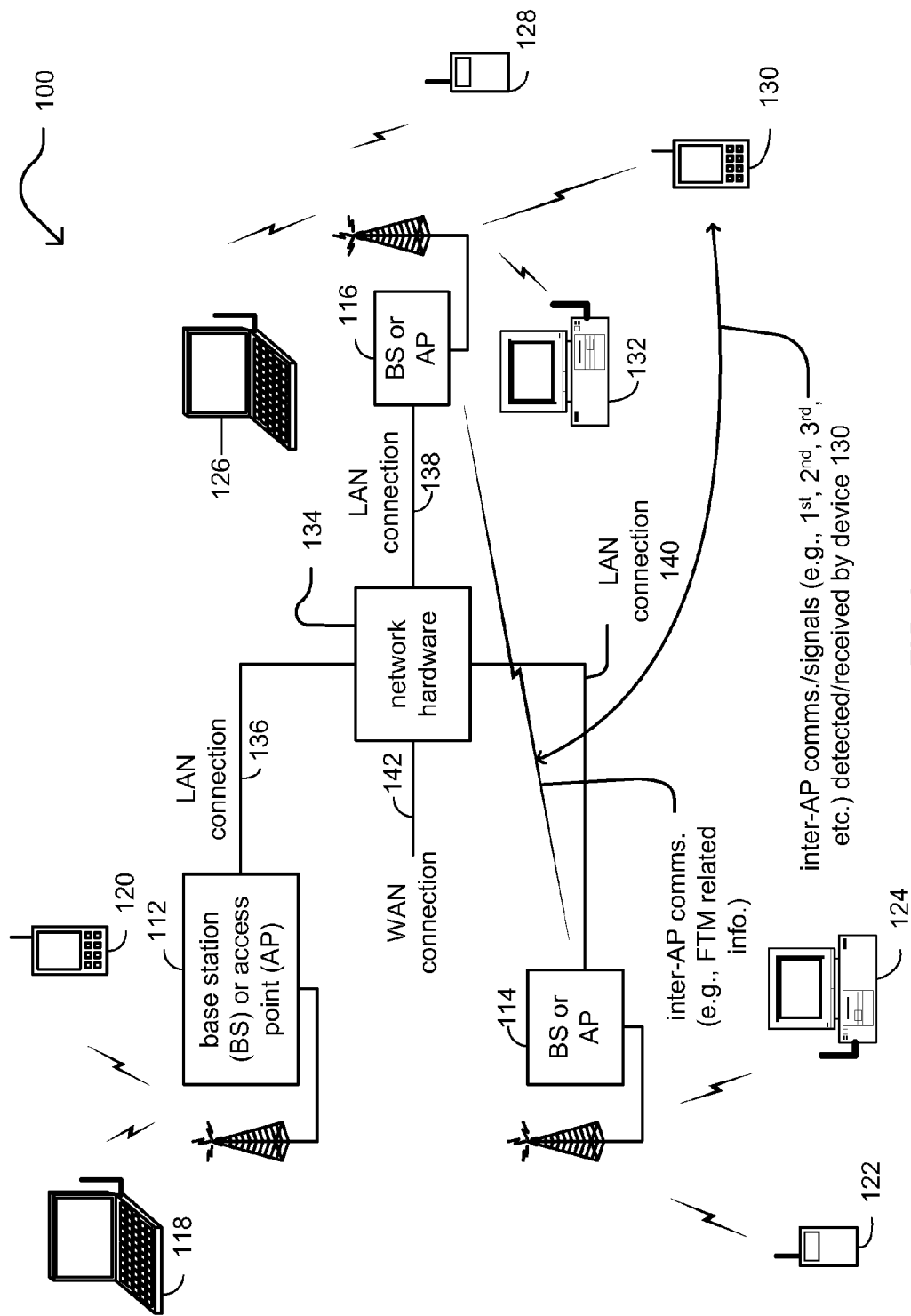
FIG. 1 is a diagram illustrating an embodiment of a wireless communication system.

FIG. 1 is a diagram illustrating an embodiment of a wireless communication system 100. The wireless communication system 100 includes base stations and/or access points 112-116, wireless communication devices 118-132 (e.g., wireless stations (STAs)), and a network hardware component 134. The wireless communication devices 118-

132 may be laptop computers, or tablets, 118 and 126, personal digital assistants 120 and 130, personal computers 124 and 132 and/or cellular telephones 122 and 128. The details of an embodiment of such wireless communication devices are described in greater detail with reference to FIG. 2.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices (WDEVs) 118-132 and BSs or APs 112-116 may include a processor and a communication interface to support communications with any other of the wireless communication devices 118-132 and BSs or APs 112-116. In an example of operation, a processor implemented within one of the devices (e.g., any one of the WDEVs 118-132 and BSs or APs 112-116) is configured to process at least one signal received from and/or to generate at least one signal to be transmitted to another one of the devices (e.g., any other one of the WDEVs 118-132 and BSs or APs 112-116).

Note that general reference to a communication device, such as a wireless communication device (e.g., WDEVs) 118-132 and BSs or APs 112-116 in FIG. 1, or any other communication devices and/or wireless communication devices may alternatively be made generally herein using the term 'device' (e.g., with respect to FIG. 2 below, "device 210" when referring to "wireless communication device 210" or "WDEV 210," or "devices 210-234" when referring to "wireless communication devices 210-234"; or with respect to FIG. 3 below, use of "device 310" may alternatively be used when referring to "wireless communication device 310", or "devices 390 and 391 (or 390-391)" when referring to wireless communication devices 390 and 391 or WDEVs 390 and 391).

The processor of any one of the various devices, WDEVs 118-132 and BSs or APs 112-116, may be configured to support communications via at least one communication interface with any other of the various devices, WDEVs 118-132 and BSs or APs 112-116. Such communications may be uni-directional or bi-directional between devices. Also, such communications may be uni-directional between devices at one time and bi-directional between those devices at another time.

For example, consider device 130 that is a personal digital assistant. Device 130 includes capability to interact with other devices within the system directly and to receive, detect, snoop, etc. signals that are transmitted between two or more other devices within the system. Device 130 includes a processor that generates, modulates, encodes, etc. and transmits signals via a communication interface of the device 130 and also receives and processes, demodulates, decodes, etc. other signals received via the communication interface of the device 130.

In an example of operation in which device 130 determines its differential distance based on communications that are performed between two other devices, consider a situation in which AP 114 communicates with AP 116. In this example, the differential distance is defined as the difference between the distance from device 130 to AP 114 and the distance from device 130 to AP 116. When the device 130 determines its differential distance with multiple pairs of APs whose locations are known to the device 130, the device 130 can determine its own locations based on that information. Note that a given AP's location is typically fixed, such as when an AP is permanently installed in a locale, and that AP's location can be determined based on various means. For example, device 130 may know the location of an AP 'a priori', by accessing at least one database via at least one network that includes the location of the AP, by processing signals received from the AP (e.g., based on MAC address, other information within such communications, etc.).

Device 130 receives, detects, snoops, etc. (generally referred to as "receives") a first signal transmitted from AP 114 to AP 116. Device 130 receives this first signal at a first time of arrival and during a designated time interval within a beacon interval. For example, a new protocol directs the device 130 specifically tries to receive such a signal between APs 114 and 116 at or during a particular time interval, such as a particular time interval specified within a beacon interval.

Device 130 receives various signals transmitted that include timestamp information during a frame exchange between the APs 114 and 116 and determines captured times of arrival of certain frames (e.g., FTM frames, modified beacons, etc. and/or other transmissions) and responses (e.g., whether acknowledgements (ACKs), null data packets (NDPs), etc. and/or other responses) as well as determines certain information included within certain of the signals.

Device 130 determines the capture time or time of arrival (ToA) of the first signal at device 130 (e.g., a first ToA). Then, device 130 receives a second signal transmitted from AP 116 to AP 114 and determines the capture time or ToA of the second signal at device 130 (e.g., a second ToA). Then, device 130 receives a third signal transmitted from AP 114 to AP 116, and this third signal includes a time of departure (ToD) of the first signal from AP 114 as well as a third ToA at which the second signal is received at AP 114 (e.g., the second signal that is transmitted from AP 116 at the ToD as determined by AP 116 and arrives at the AP 114 at the third ToA as determined by AP 114).

The device 130 then estimates its differential distance with APs 114 and 116 using the time of departure, and the three separate times of arrival determined above (e.g., first time of arrival, second time of arrival, and third time of arrival). For example, with reference to various diagrams and descriptions below (e.g., with reference to FIG. 5), device 130 estimates its differential distance with APs 114 and 116 using FTM related information (e.g., time of departure (ToD) of $m^{th}$ FTM frame captured by the AP transmitting the FTM related frames (e.g., FTM frames, modified beacons including timestamp information, etc.) that is t1_m, the time of arrival (ToA) of the response (e.g., ACK, NDP, and/or other signal) corresponding to the $m^{th}$ FTM related frame captured by the AP transmitting the FTM related frames that is t4_m, the ToA of the $m^{th}$ FTM related frame captured by device 130 that is t_c1, and the ToA of the response (e.g., ACK, NDP, and/or other signal) corresponding to the $m^{th}$ FTM related frame captured by device 130, t_c2).

The device 130 can also use other parameters to estimate its differential distance including a time of flight for signals transmitted between APs 114 and 116 as well as certain physical constants, such as the speed of light (e.g., the speed at which radio frequency signals travel through a vacuum). The device 130 determines its differential distance with the APs 114 and 116. Consider APs 114 and 116 as one pair of APs. When the device 130 determines its differential distance with multiple pairs of APs, then the device 130 can then determine its specific location or absolute location using knowledge of the location of these various pairs of APs.

In an example of operation, the device 130 firstly determines its differential distance with the APs 114 and 116. The device 130 then determines a first other estimate of its differential distance with a first other pair of APs, a second other estimate of its differential distance with a second other pair of APs, etc. The device 130 then refines its estimate using statistical processing of its differential distance, the first other estimate of its differential distance, the second other estimate of its differential distance, etc.

This new protocol specifies that FTM related information that is transmitted between APs is transmitted at or during a designated time within a beacon interval. For example, when an FTM frame exchange procedure is performed between APs, it may be performed particularly after the transmission of a beacon within a beacon interval. The device 130 can receive such FTM related information that are transmitted between APs in such an performed between APsFTM frame exchange procedure by knowing particularly whether and when such asking of frame exchanges will be performed within the beacon interval if they are performed at all. Device 130 can receive this information in prior transmitted beacons from either of the APs and/or other signal received from one or more of the APs.

By specifying the time period within the beacon interval during which an FTM frame exchange procedure will be performed, if at all, between APs, then device 130 can intelligently monitor such communications between the APs for FTM related information. The device 130 can enter into a reduced power state or sleep state out the designated time within a beacon interval in which an FTM frame exchange procedure will be performed, if at all, between APs.

Note also that the various communications between APs in an FTM frame exchange procedure may be varied. In one example, FTM frames are transmitted from AP 114 to AP 116, and the AP 116 responds to the FTM frames using acknowledgements (ACKs). In another example, modified beacons that include FTM related information (e.g., the relevant timestamp information) are transmitted from AP 114 to AP 116, and the AP 116 responds to the modified beacons that include timestamps related information using ACKs. In even another example, modified beacons that include timestamps related information are transmitted from AP 114 to AP 116, and the AP 116 responds to the modified beacons that include timestamps related information using null data packets (NDPs). In yet another example, FTM frames are transmitted from AP 114 to AP 116, and the AP 116 responds to the FTM frames using NDPs. Generally speaking, any desired types of signals and/or frames may be transmitted between APs 114 and 116 within an FTM frame exchange procedure.

Figure 2:
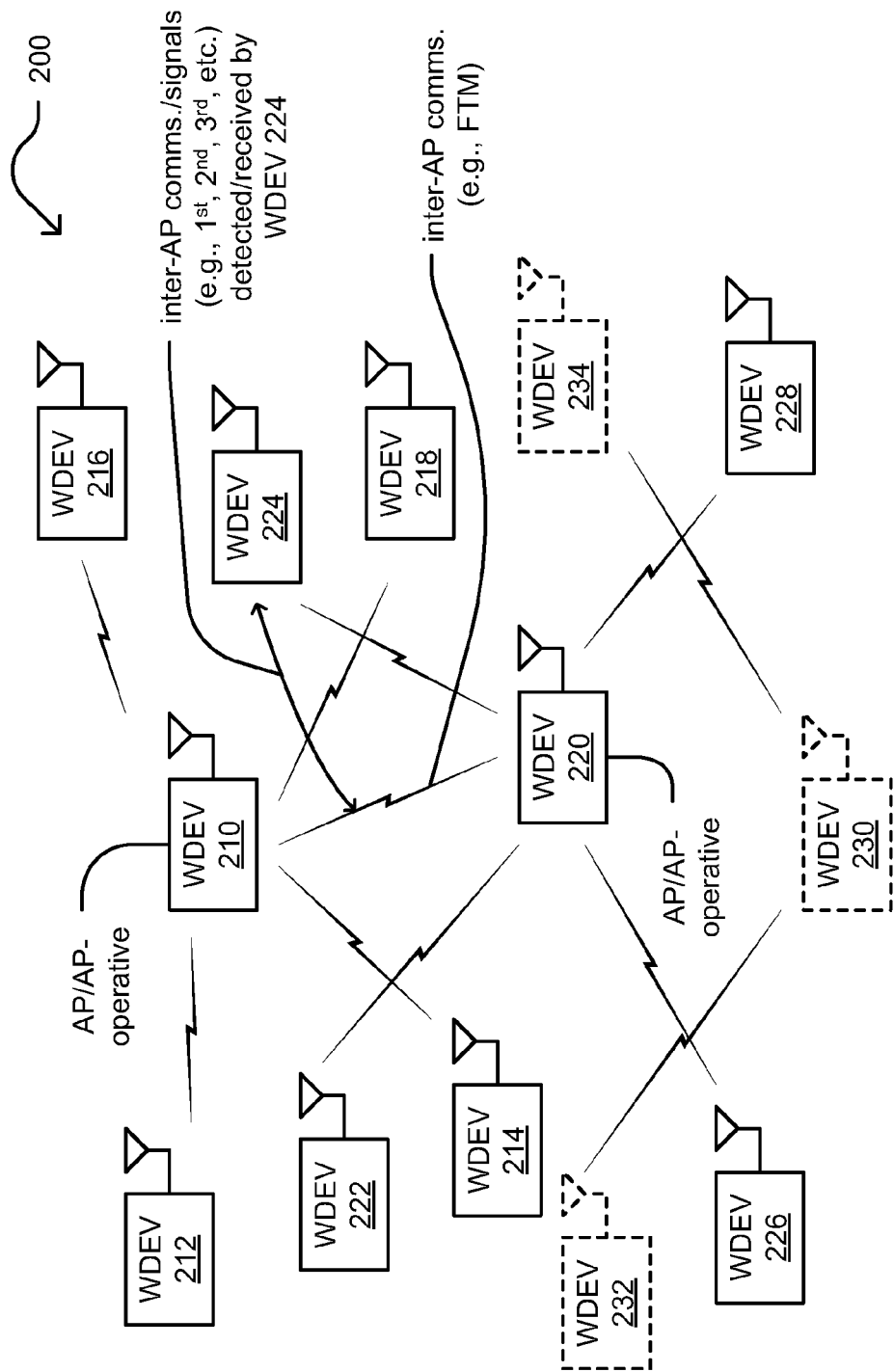
FIG. 2 is a diagram illustrating an embodiment of dense deployment of wireless communication devices.
Figure 3:
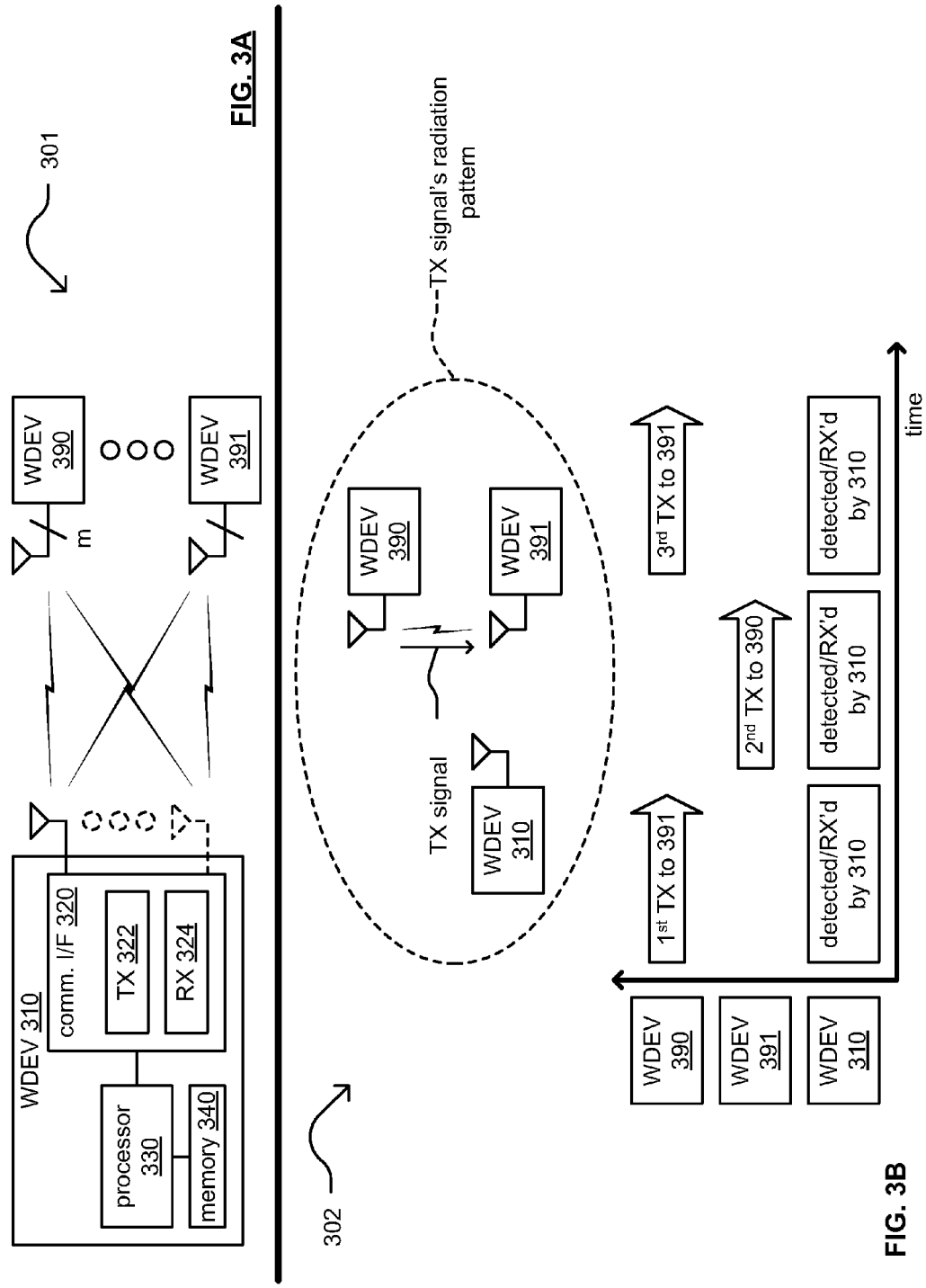
FIG. 3A is a diagram illustrating an example of communication between wireless communication devices.
FIG. 3B is a diagram illustrating another example of communication between wireless communication devices.

FIG. 2 is a diagram illustrating an embodiment 200 of dense deployment of wireless communication devices (shown as WDEVs in the diagram). Any of the various WDEVs 210-234 may be access points (APs) or wireless stations (STAs). For example, WDEV 210 may be an AP or an AP-operative STA that communicates with WDEVs 212, 214, 216, and 218 that are STAs. WDEV 220 may be an AP or an AP-operative STA that communicates with WDEVs 222, 224, 226, and 228 that are STAs. In certain instances, at least one additional AP or AP-operative STA may be deployed, such as WDEV 230 that communicates with WDEVs 232 and 234 that are STAs. The STAs may be any type of one or more wireless communication device types including wireless communication devices 118-132, and the APs or AP-operative STAs may be any type of one or more wireless communication devices including as BSs or APs 112-116. Different groups of the WDEVs 210-234 may be partitioned into different basic services sets (BSSs). In some instances, at least one of the WDEVs 210-234 are included within at least one overlapping basic services set (OBSS) that cover two or more BSSs. As described above with the association of WDEVs in an AP-STA relationship, one of the WDEVs may be operative as an AP and certain of the WDEVs can be implemented within the same basic services set (BSS).

This disclosure presents novel architectures, methods, approaches, etc. that allow for improved spatial re-use for next generation WiFi or wireless local area network (WLAN) systems. Next generation WiFi systems are expected to improve performance in dense deployments where many clients and AP are packed in a given area (e.g., which may be an area [indoor and/or outdoor] with a high density of devices, such as a train station, airport, stadium, building, shopping mall, arenas, convention centers, colleges, downtown city centers, etc. to name just some examples). Large numbers of devices operating within a given area can be problematic if not impossible using prior technologies.

In an example of operation in which WDEV 224 determines its location based on communications that are performed between multiple pairs of other devices, consider a situation in which WDEV 210 is an AP or AP-operative (e.g., referred to as WDEV/AP 210) and communicates with WDEV 220 (e.g., referred to as WDEV/AP 220) that is also an AP or AP-operative where WDEV 210 and WDEV 220 is one pair of APs. WDEV 224 receives, detects, snoops, etc. (generally referred to as "receives") a first signal transmitted from WDEV/AP 210 to WDEV/AP 220.

WDEV 224 receives this first signal at a first time of arrival and during a designated time interval within a beacon interval. For example, a new protocol directs the WDEV 224 specifically to receive such a signal between WDEVs/APs 210 and 220 at or during a particular time interval, such as a particular time interval specified within a beacon interval. Then, WDEV 224 receives a second signal transmitted from WDEV/AP 210 to WDEV/AP 220. The second signal is received at a second time of arrival such that the second signal is transmitted after the first signal is transmitted from WDEV/AP 210. Then, WDEV 224 receives a third signal transmitted from WDEV/AP 210 to WDEV/AP 220, and this third signal includes a time of departure of the first signal from WDEV/AP 210 as well as a third time of arrival at which the second signal is received at WDEV/AP 210 (e.g., the second signal that is transmitted from WDEV/AP 210 to WDEV/AP 220). The WDEV 224 then determines its differential distance with the WDEV/AP 210 and WDEV/AP 220 using the time of departure, and the three separate times of arrival (e.g., first time of arrival, second time of arrival, and third time of arrival). Consider WDEV/AP 210 to WDEV/AP 220 as one pair of APs. When the WDEV 224 determines its differential distance with multiple pair of APs, then the WDEV 224 can then determine its specific location or absolute location using knowledge of the location of these various pairs of APs.

For example, with reference to various diagrams and descriptions below (e.g., with reference to FIG. 5), WDEV 224 receives FTM related into based on transmissions between WDEV/AP 210 and WDEV/AP 220 (e.g., ToD of $m^{th}$ FTM related frame (e.g., FTM frame, modified beacon including timestamps information, etc.) captured by the AP transmitting the FTM related frames that is t1_m, the ToA of the response (e.g., ACK, NDP, and/or other signal) corresponding to the $m^{th}$ FTM related frame captured by the WDEV/AP 210 that transmits the FTM related frames that is t4_m, the ToA of the $m^{th}$ FTM related frame captured by WDEV 224 that is t_c1, and the ToA of the response (e.g., ACK, NDP, and/or other signal) corresponding to the $m^{th}$ FTM related frame captured by WDEV 224, t_c2).

The WDEV 224 can also use other parameters to estimate its location including a time of flight for signals transmitted between WDEV/AP 210 and WDEV/AP 220 as well as certain physical constants, such as the speed of light (e.g., the speed at which radio frequency signals travel through a vacuum). The WDEV 224 determines its differential distance with the WDEV/AP 210 and WDEV/AP 220. When WDEV 224 determines its differential distance with additional pairs of WDEVs/APs, then WDEV 224 can determine its specific location or absolute location using knowledge of the locations of the WDEV/AP 210 and WDEV/AP 220, as well as the additional pairs of WDEVs/APs.

FIG. 3A is a diagram illustrating an example 301 of communication between wireless communication devices. A wireless communication device 310 (e.g., which may be any one of devices 118-132 as with reference to FIG. 1) is in communication with another wireless communication device 390 via a transmission medium. The wireless communication device 310 includes a communication interface 320 to perform transmitting and receiving of at least one packet or frame (e.g., using a transmitter 322 and a receiver 324) (note that general reference to packet or frame may be used interchangeably). The wireless communication device 310 also includes a processor 330, and an associated memory 340, to execute various operations including interpreting at least one packet or frame transmitted to wireless communication device 390 and/or received from the wireless communication device 390 and/or wireless communication device 391. The wireless communication devices 310 and 390 (and/or 391) may be implemented using at least one integrated circuit in accordance with any desired configuration or combination of components, modules, etc. within at least one integrated circuit. Also, the wireless communication devices 310, 390, and 391 may each include more than one antenna for transmitting and receiving of at least one packet or frame (e.g., WDEV 390 may include m antennae, and WDEV 391 may include n antennae).

FIG. 3B is a diagram illustrating another example 302 of communication between wireless communication devices. In general, device 130's processor 330 generates, modulates, encodes, etc. and transmits signals via a communication interface 320 and also receives and processes, demodulates, decodes, etc. other signals received via the communication interface 320.

In an example of operation, the processor 330 receives, at a first time of arrival, a first signal transmitted from a first other wireless communication device (e.g., device 390) to a second other wireless communication device (e.g., device 391). This first signal is received by the device 310 during a designated time interval within a beacon interval. The device 310 captures the time of this first signal arriving at device 310 (e.g., a first time of arrival (ToA)).

The processor 330 receives, at a second time of arrival, a second signal transmitted from the second other wireless communication device (e.g., device 391) to the first other wireless communication device (e.g., device 390). The device 310 captures the time of this second signal arriving at device 310 (e.g., a second ToA). This second signal is transmitted after the first signal is transmitted by the first other wireless communication device (e.g., device 390). The processor 330 then receives a third signal transmitted from the first other wireless communication device (e.g., device 390) to the second other wireless communication device (e.g., device 391). This third signal includes a time of departure (ToD) of the first signal from the first other wireless communication device (e.g., device 390) and a third time of arrival of the second signal at the first other wireless communication device (e.g., device 390) (e.g., a third ToA).

This third signal may be an FTM frame, a modified beacon that includes timestamps information, or any other type of signal or frame that includes FTM related information including the ToD of the first signal from the first other wireless communication device (e.g., device 390) and a third time of arrival of the second signal at the first other wireless communication device (e.g., device 390). The processor 330 then estimates device 310's differential distance with APs 390 and 391 based on the content of the third signal (e.g., the ToD of the first signal from the first other wireless communication device (e.g., device 390) and a time of arrival of the second signal at the first other wireless communication device (e.g., device 390) (e.g., the third ToA)) as well as the time of the first signal arriving at device 310 (e.g., the first ToA) and the time of the second signal arriving at device 310 (e.g., the second ToA). The processor 330 also uses other parameters to estimate its differential distance including a time of flight for signals transmitted between WDEVs 390 and 391 as well as certain physical constants, such as the speed of light (e.g., the speed at which radio frequency signals travel through a vacuum). The processor 330 determines its differential distance with WDEVs 390 and 391. Consider WDEVs 390 and 391 as one pair of APs. When the processor 330 determines device 310's differential distance with multiple pair of APs, then the processor 330 can then determine device 310's specific location or absolute location using knowledge of the location of these various pairs of APs.

Note also that device 310 may be implemented to operate primarily or sometimes in a reduced power state or a sleep state. In such instances, device 310 awakens from the reduced power state or a sleep state to try to receive such signals transmitted between WDEVs 390 and 391 within a designated time interval within a beacon interval. When FTM related information is identified within such signals, the device 310 may perform certain operations to determine its location based on that FTM related information. The device 130 can return to the reduced power state or the sleep state outside of the designated time interval within the beacon interval. In addition, after performing the operations to determine its location based on the FTM related information, the device 130 can return to the reduced power state or the sleep state, if desired.

Figure 4:
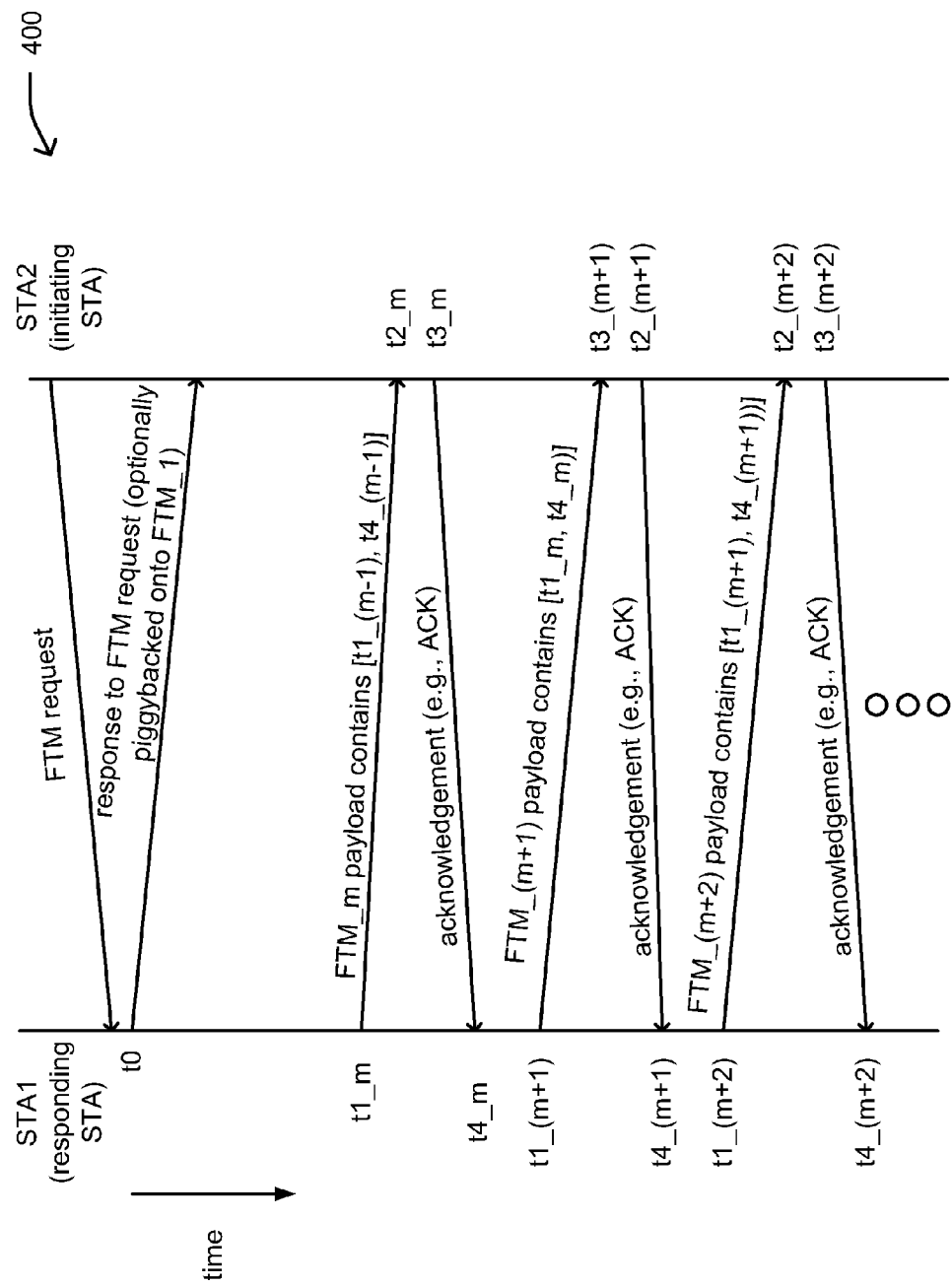
FIG. 4 is a diagram illustrating an example of fine timing measurement (FTM) frame exchange that is preceded by a FTM request frame and a response to the FTM request frame.

FIG. 4 is a diagram illustrating an example 400 of fine timing measurement (FTM) frame exchange that is preceded by a FTM request frame and a response to the FTM request frame. Existing approaches to perform such Fine Timing Measurement (FTM) can be less than optimal and/or provide less than accurate measurement. This disclosure presents modifications and enhancements to the Fine Timing Measurement (FTM) to provide for improved performance. This disclosure uses the Fine Timing Measurement feature as an example to illustrate certain operations, and this can also be applied similarly to the Timing Measurement feature in the same fashion.

The Fine Timing Measurement (FTM) allows a wireless station (STA) (e.g., a wireless communication device) to accurately measure the Round Trip Time (RTT) between it (e.g., STA2, shown as located on right hand side) and another STA (e.g., STA1, shown as located on left hand side). Generally, an initiating wireless communication device (e.g., STA2) transmits a FTM request to a responding wireless communication device (e.g., STA1). The responding wireless communication device (e.g., STA1) then generates and transmits a response to the FTM request frame (e.g., which may be referred to as an 'FTM response' or generally as a 'response' or a 'response to the FTM request frame') to the initiating wireless communication device (e.g., STA2). Note that the response to the FTM request frame may be generated and transmitted using any of a number of different means. In one example, the response to the FTM request may be piggybacked within an FTM frame (e.g., FTM_1).

In another example, the response to the FTM request frame may be a general response. One example of a response to the FTM request frame includes an acknowledgement (ACK) frame. In another example, the response to the FTM request frame may be included within a block acknowledgement (BACK) frame. In yet another example, the response to the FTM request frame may be an FTM acknowledgement (ACK) frame. In another example, the response to the FTM request frame may be piggybacked onto or included within any other frame (e.g., besides an FTM frame) transmitted from the wireless communication device to the other wireless communication device via the communication interface. Any desired form of response may be used to generate and transmit the response to the FTM request frame to the other wireless communication device.

The initiating wireless communication device (e.g., STA2) and the responding wireless communication device (e.g., STA1) make various subsequent frame exchanges (e.g., FTM frames) of FTM_m, FTM_(m+1), FTM_(m+2), etc. and responses to the FTM frames/acknowledgements (ACKs). The responding wireless communication device (e.g., STA1) transmits the FTM_m frame, which includes t1(m−1) and t4_(m−1) in its payload, after transmitting a response to the FTM request to the initiating wireless communication device (e.g., STA2) in response to the FTM request received from the initiating wireless communication device (e.g., STA2). The time t1_m corresponds to the transmission time of the $m^{th}$ FTM frame captured by the responding STA1, the time t2_m corresponds to the reception time of the $m^{th}$ FTM frame captured by the initiating STA2, the time t3_m corresponds to the transmission time of the ACK frame in response to the $m^{th}$ FTM frame captured by the initiating STA2, and t4_m corresponds to the reception time of the ACK frame that is in response to the $m^{th}$ FTM frame captured by the responding STA1.

The responding wireless communication device (e.g., STA1) provides additional FTM frames (e.g., $(m+1)^{th}$ FTM frame, denoted as FTM_(m+1), $(m+2)^{th}$ FTM frame, denoted as FTM_(m+2), etc.) to the initiating wireless communication device (e.g., STA2) that indicate additional respective transmission times of the corresponding FTM frames and the reception times the corresponding ACKs. The initiating wireless communication device (e.g., STA2) transmits additional ACKs in response to these additional received FTM frames and captures additional respective reception times of the corresponding FTM frames and transmission times of the corresponding ACK.

Note that alternative implementations of this FTM frame exchange may be performed that includes transmitting modified beacons, other signals, or other types of frames that include FTM related information and/or timestamps related information, and responses to such modified beacons, other signals, or other types of frames may also have various forms (e.g., acknowledgement (ACK), null data packet (NDP), other signals, or other types of frames).

Generally speaking, when signals are transmitted between devices (e.g., between two APs), and when those signals include FTM related information, a third device (e.g., a STA) can receive those signals transmitted between the APs and process the FTM related information to assist in determining its location. When locations of the two APs are known 'a priori' to the third device (e.g., STA), then that third device can determine its differential distance with the two APs by snooping the signal that include the FTM related information (e.g., FTM frames, modified beacons that include timestamps related information, ACKs, NDPs, and/or other types of signals or frames, etc.). In addition, such operations may be performed with respect to more than one pair of APs. For example, a third device (e.g., a STA) can perform such snooping of signals including timestamps related information between a first pair of APs, a second pair of APs, etc.

When the third device processes the content of the snooped frames, the times of arrival (ToAs) of the FTM related frames (e.g., FTM frames, modified beacons including timestamps related information, etc.) and the corresponding response frame (e.g., ACK, NDP, and/or other signal) captured at the third device, it can determine its differential distance with one particular pair of APs. When the third device performs such operation with multiple pairs of APs, the third device can determine its location.

Figure 5:
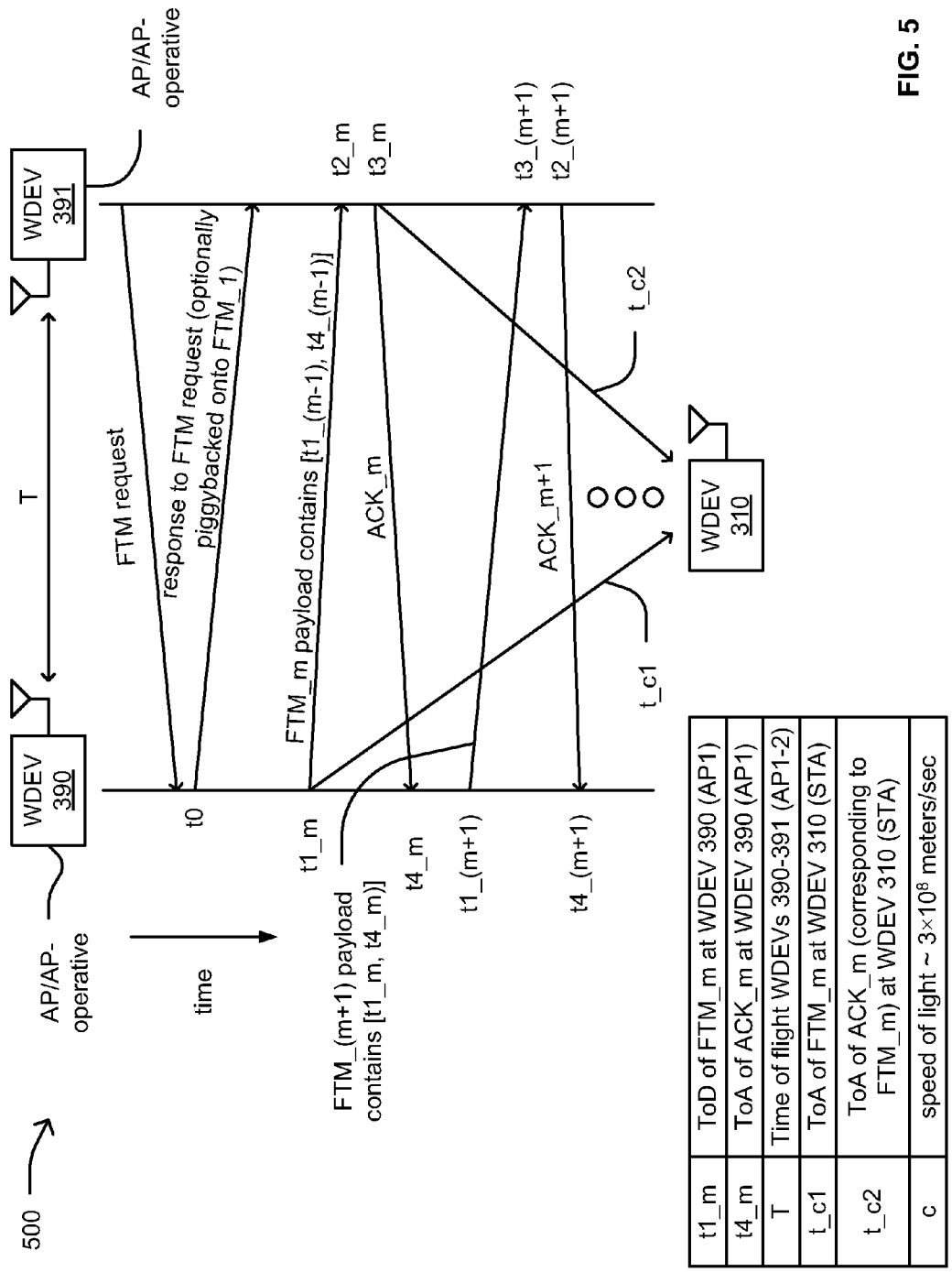
FIG. 5 is a diagram illustrating an example of a wireless communication device (e.g., STA) receiving, detecting, and/or capturing communications between two other wireless communication devices (e.g., two different access points (APs)).

FIG. 5 is a diagram illustrating an example 500 of a wireless communication device (e.g., STA) receiving, detecting, and/or capturing communications between two other wireless communication devices (e.g., two different access points (APs)).

In an example of operation, WDEV 310 receives, at time t_c1, a signal (e.g., FTM frame (FTM_m), a modified beacon (Beacon_m) including timestamps related information, etc.) transmitted from WDEV/AP 390 to WDEV/AP 391. This FTM frame is received by the device 310 during a designated time interval within a beacon interval. Then, the WDEV 310 receives, at time t_c2, a second signal (e.g., an ACK) transmitted from the WDEV/AP 391 to the WDEV/AP 390. This second signal is transmitted after the first signal is transmitted by the WDEV/AP 390.

The WDEV 310 then receives a third signal transmitted from the WDEV/AP 390 to the WDEV/AP 391 (e.g., third signal being FTM frame (FTM_m+1)) transmitted from WDEV/AP 390 to WDEV/AP 391). This third signal includes a time of departure of the first signal from the WDEV/AP 390 (t1_m) and a third time of arrival of the second signal at the WDEV/AP 390 (t4_m). This third signal may be an FTM frame, a modified beacon that includes timestamps related information, or any other type of signal or frame that includes FTM related information including the time of departure of the first signal from the WDEV/AP 390 (t1_m) and a third time of arrival of the second signal at the WDEV/AP 390 (t4_m). The WDEV 310 then estimates its differential distance with WDEV/AP 390 and WDEV/AP 391 based on the content of the third signal (i.e., the ToD of the first signal at WDEV/AP 390, the ToA arrival of the second signal at WDEV/AP 391), the ToA of the first signal at WDEV 310, and the ToA of the second signal at WDEV 310 (e.g., a ToD and first, second, and third ToAs).

The WDEV 310 can also use other parameters to estimate its differential distance including a time of flight for signals transmitted between WDEVs 390 and 391 as well as certain physical constants, such as the speed of light (e.g., c, which is the speed at which radio frequency signals travel through a vacuum). The WDEV 310 determines its differential distance with WDEV 390 and WDEV 391. Consider devices 390 and 391 as one pair of APs, WDEV 310 determines its differential distance with multiple pair of APs, it can then determine its specific location or absolute location using knowledge of the location of these APs.

An example of the calculations to determine this differential distance is as follows:

Differential Distance(denoted as $D\_12$)=(distance between WDEV/AP 390 and client STA/WDEV 310)–(distance between WDEV/AP 391 and client STA/WDEV 310)

$$D\_12 = c \times [(t\_c1 - (t\_c2 - (t4\_m - t1\_m - T))] \quad \text{Eq. (1)}$$

where:

T1_m: ToD of FTM_m at AP1 (contained in payload of FTM_(m+1), which is the third signal).

T4_m: ToA of ACK corresponding to FTM_m at AP1 (contained in payload of FTM_(m+1), which is the third signal)

T: Time of flight between AP1 and AP2 (known as 'a priori' to the client STA because the AP locations are known to the client STA)

t_c1: ToA of FTM_m at client STA (FTM_(m) is a first signal)

t_c2: ToA of ACK (corresponding to FTM_m) at client STA (ACK is a second signal)

c: speed of light

Some details and example types of frame formats are described below for the convenience of the reader. Note that other types of frames and other types of frame formats may alternatively be used in various implementations.

Some of these example types of frame formats are also described in the following reference:

[1] IEEE P802.11-REVmc/D1.5, IEEE Standard for Information Technology—Telecommunications and information exchange between systems, local and metropolitan area networks—Specific requirements, Part 11: Wireless LAN Medium Access Control (MAC) and Physical Layer (PHY) Specifications FIG. 6A is a diagram illustrating an example 601 of an FTM request frame format. This fine timing measurement request frame format is also described in FIG. 8-576 of [1] referenced above. This includes three octets for each of category, action, and trigger. The trigger value may be 0 or 1, where 0 indicates the start of FTM frame transmission and 1 indicates the stop of FTM frame transmission. Further details may be found regarding this example format in [1].

FIG. 6B is a diagram illustrating another example 601 of an FTM request frame format. This fine timing measurement request frame format is also described in FIG. 8-577 of [1] referenced above. In this format, different fields are provided for category, action, dialogue token, follow-on dialogue token, time of departure (ToD), time of arrival (ToA), maximum time of departure (ToD) error, and maximum time of arrival (ToA) error. Further details may be found regarding this example format in [1].

In prior communication standards, protocols, and/or recommended practices, there is no mechanism that indicates that signals including FTM related information and/or timestamps related information are being transmitted between APs. As such, a client device/STA will not have knowledge regarding when such signals including FTM related information and/or timestamps related information are in fact transmitted between APs. As a result, such a client device/STA would need to snoop potentially for an extensive period of time to learn whether signals including FTM related information and/or timestamps related information are being transmitted between APs. This can be highly consumptive in terms of processing capability, energy, power, etc. this can be problematic within devices that are power limited (e.g., battery-operated devices, mobile devices, personal devices, etc.).

A new protocol is presented in this disclosure to indicate ongoing AP to AP FTM related communications and/or timestamps related communications (e.g., that may not include FTM frames but instead other frames that include timestamps related information). There is a clear indication of ongoing AP to AP FTM transmissions that inform a client device/STA about the existence of such AP to AP FTM transmissions. The client device/STA can then snoop at the appropriate times for such FTM related information.

Different methods may be used to indicate AP to AP FTM related communications. In one example, a reserved bit in an Extended Capabilities Information Element (IE) may be set to a particular value to indicate AP to AP FTM transmissions active. This may be included within beacons, probe response frames, and/or other frame/transmissions. Alternatively, in another example, other data structures (e.g., such as a different or new type of Information Element (IE)) may be included within beacons, probe response frames, and/or other frame/transmissions.

Figure 6C:
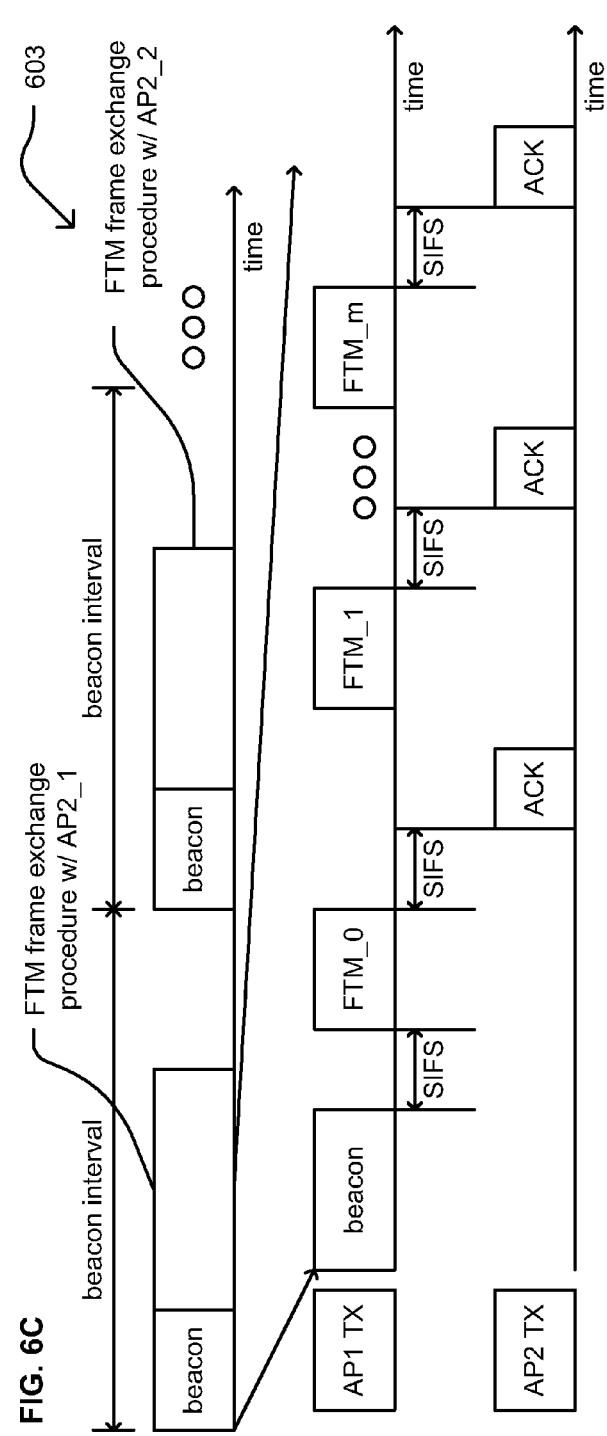
FIG. 6C is a diagram illustrating an example of timing of AP to AP FTM communications.

FIG. 6C is a diagram illustrating an example 603 of timing of AP to AP FTM communications. In this example, after an initial FTM request frame has been transmitted from one AP (AP2) to another AP (AP1) to start the FTM frame exchange procedure or FTM transmission process, then a new protocol specifies that only FTM frames may be transmitted by the AP1 immediately following a beacon within a beacon interval and that additional FTM request frames might not be transmitted within the current or he subsequent beacon intervals. For example, an AP (AP1) may then transmit a first FTM frame immediately after beacon transmission. An example time interval between the end of the beacon transmission in the beginning of the FTM frame may be short interframe space (SIFS) or point coordination function (PCF) interframe space (PIFS). In such an operation, after every beacon, the second and subsequent FTM frames, if any, may be transmitted using communication medium contention rules such as those defined in [1]. Certain examples of communication medium contention rules include carrier sense multiple access/collision avoidance (CSMA/CA), operation based on certain rules including scheduled back offs, scheduled access such as based on the prior agreement between the APs, etc. Generally, any desired medium contention rules agreed upon by the APs may be used to govern the transmission of the second and subsequent FTM frames. Using this approach, a client device/STA will know to snoop for FTM related information in the signals transmitted between the APs immediately following the transmission of a beacon. In this example 603, the responding AP2 transmits an acknowledgement (ACK) to AP1 after an SIFS has elapsed after an FTM frame has been transmitted from AP1. The timing gap between an ACK and the next FTM may be determined by one or more of the APs during FTM set up.

Note also that a given AP (AP1) may execute difference FTM frame exchange procedures with different other APs (e.g., perform a first FTM frame exchange procedure with a first other AP (AP2_1) during a first beacon interval, perform a second FTM frame exchange procedure with a second other AP (AP2_2) during a second beacon interval, etc.). If desired, the specific responding AP in a given FTM frame exchange procedure may be different for different beacon target beacon transmission times (TBTTs).

Within this example, associated client devices/STAs may operate by waking up to listen for beacons or delivery traffic indication message (DTIM) beacons at particular times (e.g., such as the beginning of each beacon interval). Within this new protocol that specifies that an FTM frame exchange procedure, when performed, occurs immediately following the transmission of the beacon, the client device/STA can operate more efficiently and save more energy and power by snooping for and receiving FTM related information immediately after receiving the beacons. As such, the client device/STA does not need to wake up at other times specifically to snoop for FTM related information thereby saving power.

Note that a client device/STA can discover such FTM related information transmitted between APs even when that client device/STA is not associated with one of those APs. Also, a client device/STA that is scanning and discovers a beacon while scanning is also able to receive FTM exchanges without having to scan further or perform other operations to find the FTM exchanges. In this example 603, the discovery of a beacon by the client device/STA will be associated with the discovery of a set of FTM exchanges, when performed by the APs, since this new protocol specifies that FTM frame exchange procedures, when perform, occur after the transmission of a beacon within the beacon interval.

Figures 7A, 7B:
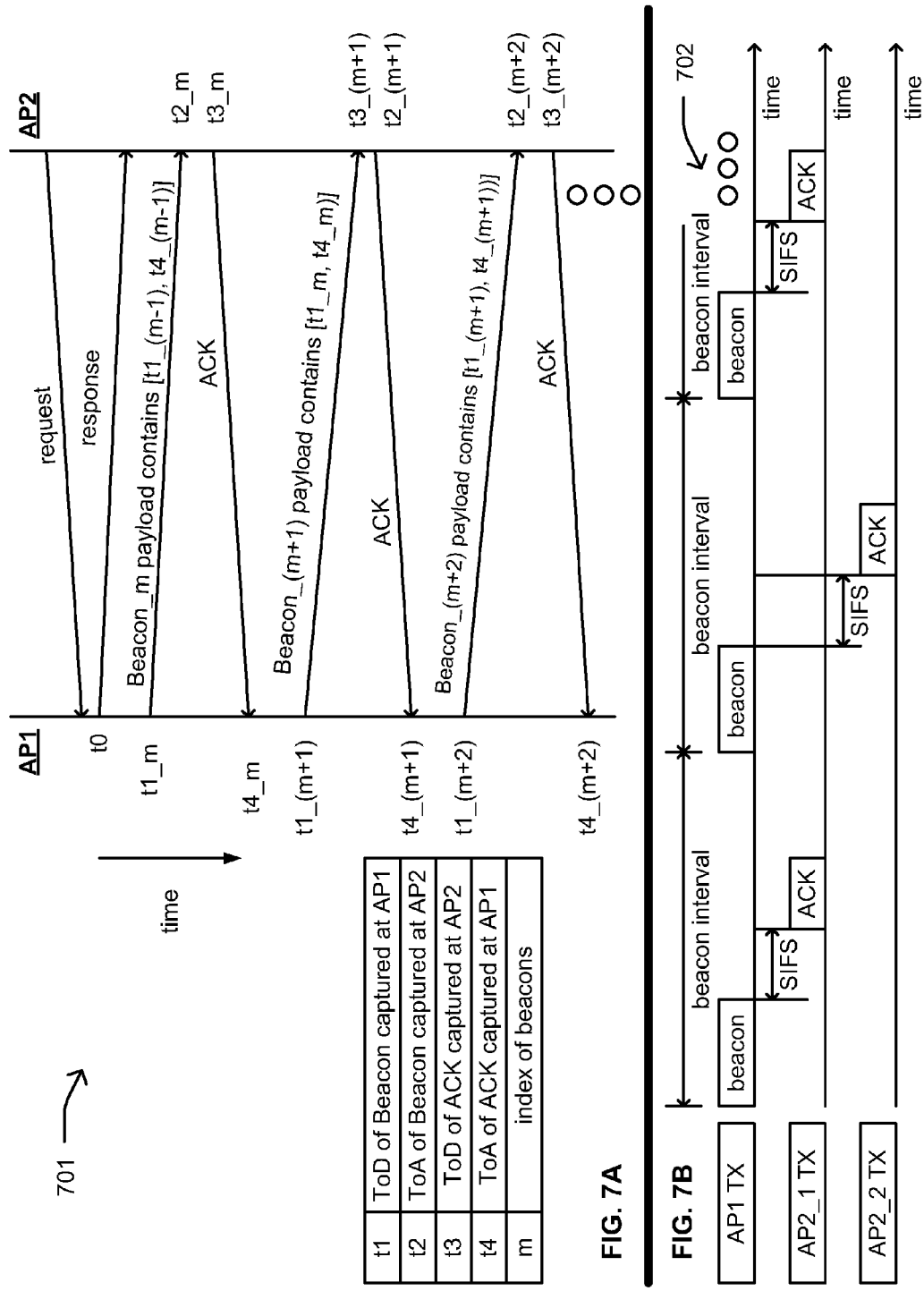
FIG. 7A is a diagram illustrating an example of AP to AP communications including beacons containing timestamps.
FIG. 7B is a diagram illustrating an example of timing of AP to AP communications based on the frame exchange of FIG. 7A.

FIG. 7A is a diagram illustrating an example 701 of AP to AP communications including beacons containing timestamps. This diagram is very similar to that of FIG. 4 with at least one difference being that modified beacons include timestamps related information. Instead of AP1 transmitting FTM frames to AP2 separately from beacons, AP1 transmits modified beacons that include timestamps related information therein to AP2. The AP2 can respond to these modified beacons using ACKs as shown in the diagram. Referring also to FIG. 5 where FTM frames and ACKs are received by device 310, in this example 701, modified beacons are received in place of the FTM frames. Nonetheless, similar processing may be performed by device 310 to determine its location based on processing information within these various transmissions between the APs such that the modified beacons include timestamps related information are used instead of FTM frames.

In an example of operation, WDEV 310 receives, at time t_c1, a first signal (e.g., Beacon_m that includes timestamps information) transmitted from AP1 to AP2. This beacon is received by the device 310 at target beacon transmission times (TBTTs) (e.g., which may be viewed as designated time period within a beacon interval as well, and in this case, specifically at the TBTTs). Subsequently, the WDEV 310 receives, at time t_c2, a second signal (e.g., an ACK) transmitted from the AP2 to the AP1. This second signal is transmitted after the first signal is transmitted by the AP1.

The WDEV 310 then receives a third signal transmitted from the AP1 to the AP2 (e.g., third signal being Beacon_(m+1) that includes timestamps information transmitted from AP1 to AP2). This third signal includes a time of departure of the first signal from the AP1 (t1_m) and a third time of arrival of the second signal at the AP1 (t4_m). This third signal is a modified beacon that includes timestamps information in this instance and includes the time of departure of the first signal from the AP1 (t1_m) and a third time of arrival of the second signal at the AP1 (t4_m).

FIG. 7B is a diagram illustrating an example 702 of timing of AP to AP communications based on the frame exchange of FIG. 7A. In this example, the client device/STA can calculate its differential distance with the AP1 and AP2. When the client device/STA determines its differential distance with multiple pairs of APs, it can then determine its specific location or absolute location using knowledge of the location of these APs. As can be seen in this diagram, a separate transmission of an FTM frame from AP1 is not needed subsequent to transmission of the beacon given that the beacon includes timestamps related information. As with other examples, note also that a given AP (AP1) may execute these exchange procedures with different other APs (e.g., transmit the modified beacons including timestamps information to a first other AP (AP2_1) at a first target beacon transmission time (TBTT), transmit the modified beacons including timestamps information to a second other AP (AP2_2) at a second TBTT, etc.). If desired, the specific responding AP in a given frame exchange procedure may be different for different beacon TBTTs.

Various means may be used by an AP to notify one or more other APs to transmit an ACK to a beacon. For example, when AP1 executes an FTM frame exchange procedure with more than one AP (e.g., AP2_1 and AP2_2), AP1 can provide a schedule to those other APs regarding when to transmit an ACK in response to a specific beacon.

FIG. 8A is a diagram illustrating an example format 801 of a timestamp responding AP map information element (IE) when transmitted in a multicast frame. This IE includes an element ID field, a length field that specifies how many responding APs are identified within the IE, followed by the respective information for each of the responding APs. The length field is variable in length depending on how many responding APs are included within the IE.

FIG. 8B is a diagram illustrating an example format 802 of a responding AP field that may be used with the IE of FIG. 8A. This shows one particular information field that may be included in the above IE of FIG. 8A. This field includes multiple subfields corresponding to the responding APs index value, MAC address, beacon count, and response interval.

One example of the contents of the "Responding AP2_x info." field of the "Timestamp Responding AP MAP" IE format is as follows:

"Responding AP2_x's index value" field: contains an integer value between 0 and 255, which maps the MAC address of responding AP2_x to an integer value.

"Responding AP2_x's MAC address": contains the MAC address of AP2_x

"Beacon Count" field: contains an integer value between 0 and 255, which indicates the count to the first Beacon to which AP2_x shall response with an ACK. For example, when the "Timestamp Responding AP Map" IE is included in a management frame that is not a Beacon, a value of 0 of this field indicates that the first Beacon to which AP2_x responses with an ACK is the first Beacon that AP1 transmits after the successfully transmitted management frame containing the "Timestamp Response AP Map" IE; when the "Timestamp Responding AP Map" IE is included in a Beacon, a value of 0 of this field indicates that the first Beacon to which AP2_x responses with an ACK is the current Beacon including the "Timestamp Responding AP Map" IE. A value of "1" indicate the first Beacon to which AP2 shall responds with an ACK is the Beacon after the Beacon corresponding to the value of "0" of this field. And, so on and so forth.

"Response Interval" field: an integer value between 0 and 255, which indicates the number of Beacon periods between the two consecutive ACKs transmitted by AP2_x, with each ACK corresponding to one Beacon, respectively.

FIG. 8C is a diagram illustrating another example format 803 of a timestamp responding AP map IE and specifically for use in a unicast frame. This example format 803 is similar to the example format 801 but includes information corresponding to only one responding AP.

In one example, AP1 generates a mapping between an index value and the media access control (MAC) of a responding AP (e.g., AP2) and the schedule by which a specific AP2 (e.g., AP2_1 and AP2_2) should transmit ACKs in response to beacons. For example, an information element (IE), such as a timestamp responding AP map as an example format 801 of this diagram or example format 803 of FIG. 8C may be included within an unencrypted multicast management frames (e.g., beacons or other frames) and/or unicast management frames, respectively.

In an example of operation, AP1 transmits the IE based on example format 801 to AP2 either in an unencrypted multicast management frame that is not a beacon or alternatively within a beacon. When transmitted within a beacon, such information may be included in every beacon or in one or more other beacons to eliminate unnecessary beacon size increase when not needed.

In another example of operation, AP1 transmits the IE based on example format 803 of FIG. 8C to AP2 in a unicast management frame. In an alternative example, AP1 piggybacks the IE in a frame that is used for some other purpose.

The example method illustrated by FIG. 8A, FIG. 8A, FIG. 8Bm and FIG. 8C is denoted Option A such that AP1 uses to notify AP2 about its schedule to transmit an ACK (or UDP or other similar frame) to a modified Beacon. Alternatively, FIG. 8D illustrates Option B that AP1 uses to notify AP2 about its schedule to transmit an ACK (or UDP or other similar frame) to a modified beacon.

FIG. 8D is a diagram illustrating an example format 804 of a ranging timestamps IE. In this example of operation, AP1 includes the MAC address of AP2 in an IE based on the example format 804. This is included in the beacons transmitted from AP1 to indicate that AP2 should respond to the beacon containing the IE with an ACK. Note also that different options and values may be used to indicate that AP2 should respond to the beacon containing the IE with another type of response (e.g., null data packet (NDP), or other type of response).

Note that the AP1 may update and modify the mapping and schedule information by transmitting updated and modified IEs/frames containing such updated information in any of the various examples of operation described herein. Note also that any other types of data structures that might contain such information may also be used in various embodiments.

FIG. 8E is a diagram illustrating another example format 805 of a ranging timestamps IE. This example format 805 is similar to the example format 804 with the exception that AP1 includes an ID (identifier) of AP2 in an IE instead of the MAC address. Such an identifier may be a relatively much shorter means to identify AP2 (e.g., a single octet versus multiple (6) octets)

An AP includes the timestamps and related information in an IE, or information fields or other data structure based on the following. For example, different example IEs, named "Ranging_Timestamps", is illustrated in FIG. 8D and FIG. 8E, respectively.

The methods illustrated in FIG. 8D and FIG. 8E are denoted as Option 1 and Option 2, respectively.

The use of "Dialog token", "Follow on dialog token", "ToD", "ToA", "Max ToD Error", "Max ToA Error" fields are the same as the same fields in the Fine Timing Measurement frame as illustrated in FIG. 6B above.

In one example, such a new "Timestamp Responding AP's MAC address" field contains the MAC address of the AP2 that transmits the ACK frames in response to the Beacons containing the "Ranging_timestamps" IE.

In another example, such a new "Timestamp Responding AP's Index Value" field contains the index value of the AP2 that transmits the ACK frames in response to the Beacons containing the "Ranging_timestamps" IE.

The index value is as defined in "Responding AP2_x's Index Value" subfield of the "Responding AP2_x info" field of the "Timestamp Responding AP Map" IE, as illustrated in FIG. 8B.

Also, note that the AP may include the timestamps and related information in other data structure (e.g., other fields/IE/frame) in other examples.

The table below indicates an example of combination of different methods that may be used by AP1 to notify AP2 particularly when and how to respond to transmissions from AP1 based on the "Ranging_timestamps" IE described in FIG. 8D and FIG. 8E.

|  |  | AP1 includes "Ranging_timestamps" IE in its beacons | |
| --- | --- | --- | --- |
|  |  | Option 1: (including AP2's MAC address) | Option 1: (including AP2's Index Value) |
| AP1 notifies AP2 when/how to respond | Option A: included in unicast management frame | Yes | Yes |
|  | Option A: included in unencrypted multicast management frame | Yes | Yes |
|  | Option B | Yes | No |

With respect to operation based on this example in which beacons include FTM related information, when a client device/STA is capable of and does operate within a reduced power state or sleep state, that client device/STA will typically awaken from the reduced power state or sleep state to listen to beacons of delivery traffic indication messages (DTIMs) at specified times such as at the beginning of beacon intervals. These modified beacons that include timestamp information allow the client device/STA to save more power by receiving the beacons and the ACKs (which are relatively shorter frames) without the need to wake up at other times specifically to snoop for frames containing FTM related information. The client device/STA may operate more efficiently, save power, extend battery life, etc.

A communication protocol that operates using existing beacon frames (e.g., modified to include timestamps related information) and the ACK frames transmitted in response to the beacons incurs a minimal increase in overhead.

Also, as described with respect to other examples, a client device/STA that is scanning and discovers a beacon while scanning is also able to receive exchanges for use in determining location without having to scan further or perform other operations to find these exchanges. The discovery of a beacon by the client device/STA will be associated with the discovery of a set of exchanges for use in determining location, when performed by the APs, since this new protocol enables a client/STA to process beacons and newly defined ACKs (or UDPs) as responses to the beacons to obtain information for use in determining location. In such examples, the beacons themselves serve similar purposes of FTM frames in other examples. As a result, the client device/STA does not need to wake up at other times to process other frames in order to obtain information necessary for location determination.

Also, because beacons are typically transmitted at a lower modulation, modulation coding set (MCS), lower rate, lower, bandwidth, etc. and are transmitted not as frequently as the typical FTM frames, this approach that uses modified beacons may be more desirable for a client device/STA to generate a proximity estimate when location accuracy requirement is not high and location update frequency requirement is low.

Figures 9A, 9B:
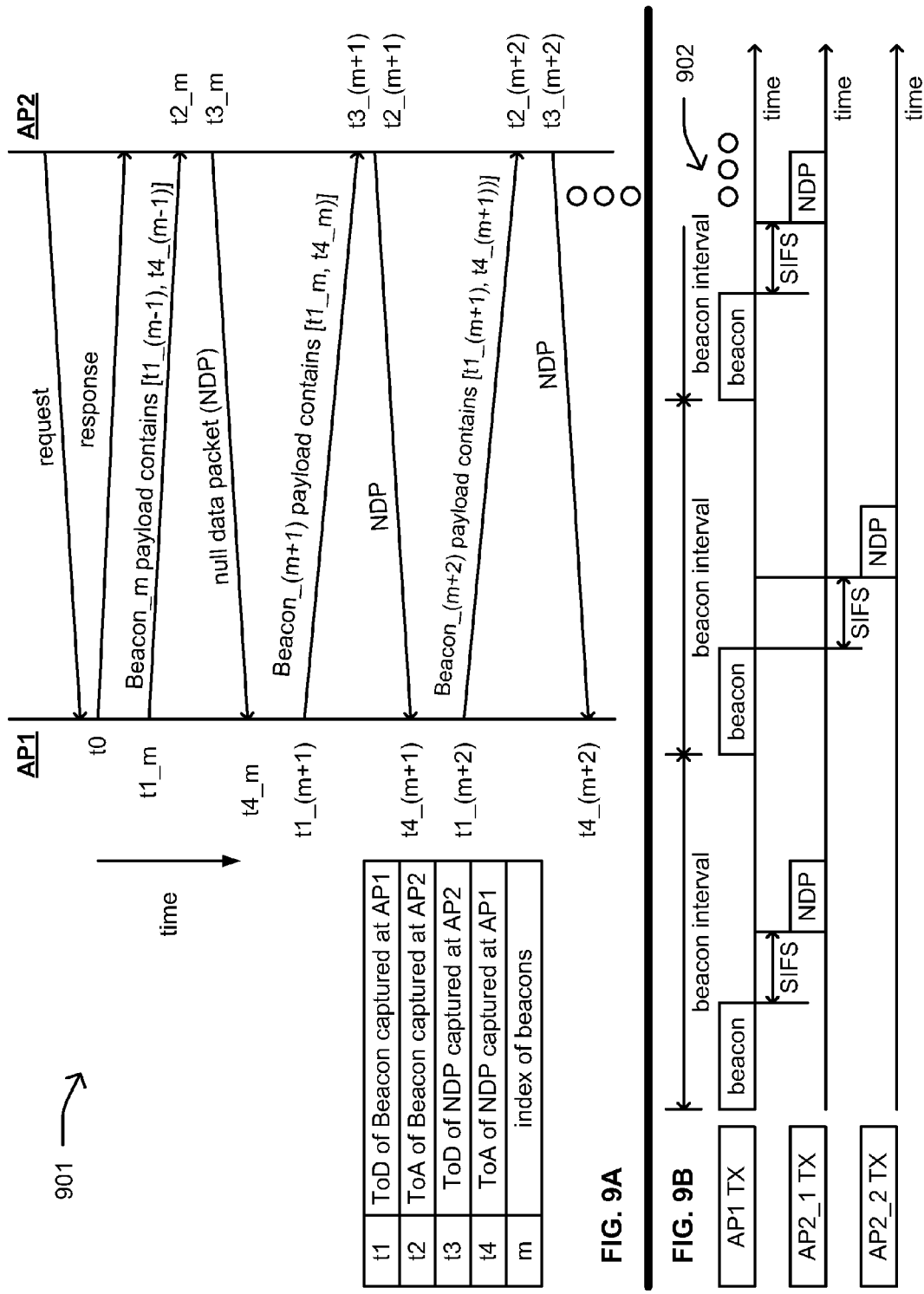
FIG. 9A is a diagram illustrating another example of AP to AP communications including beacons containing timestamps.
FIG. 9B is a diagram illustrating another example of timing of AP to AP communications based on the frame exchange of FIG. 9A.

FIG. 9A is a diagram illustrating another example 901 of AP to AP communications including beacons containing timestamps. This example 901 is similar to the example 701 with at least one difference being that null data packets (NDPs) (instead of acknowledgements (ACKs)) are transmitted from AP2 to AP1 in response to the modified beacons that include timestamps related information. Typically, the air time (e.g., duration of transmission) of a NDP is less than the air time of an ACK. The client device/STA may perform similar calculations and operations to determine its location based on this example 901 except that NDP is used instead of ACK.

FIG. 9B is a diagram illustrating another example 902 of timing of AP to AP communications based on the frame exchange of FIG. 9A. This example 902 is similar to the example 702 with at least one difference being that NDPs (instead of ACKs) are transmitted from AP2 to AP1 in response to the modified beacons that include timestamps related information.

Note also that any other types of frames may be used within alternative examples of frame exchange procedures that include timestamps related information. For example, different types of frames (besides ACK, NDP, etc.) may be transmitted from AP2 to AP1 in response to an FTM frame, a modified beacon that includes timestamps related information, or some other type of frame that includes timestamps related information.

Note also that other frame formats besides the particular examples of data structure and format of the fields, Information Elements (IEs), the exact placement of frames, etc. may be used in other examples without a loss of generality. The operations and functionality described herein may be generally applied to any types of wireless communications. For example, a wireless communication device may operate using such functionality within any wireless local area network (WLAN) frequency bands including, but not limited to, 2.4 GHz, 5 GHz, 60 GHz, 900 MHz, or TV white space, etc. and may operate based on any type of WLAN topologies (e.g., Infrastructure BSS, IBSS, mesh, or WiFi Direct, etc.).

FIG. 10A is a diagram illustrating an embodiment of a method 1001 for execution by one or more wireless communication devices. The method 1001 begins by operating a wireless communication device (e.g., STA) to receive a first signal (e.g., an FTM frame (FTM_m)) and capture its time of arrival (ToA) t_c1 (block 1010). The method 1001 then operates such that the STA receives a second single (e.g., ACK or NDP in response to the first signal (e.g., an FTM frame (FTM_m)) and capture its ToA t_c2 (block 1020). The method 1001 continues to operate such that the STA receives a third signal (e.g., another FTM frame (FTM_(m+1)) and processes its content to obtain t1_m and t4_m (block 1030). The method 1001 then operates such that the STA uses t_c1, t_c2, t1_m and t4_m and other parameters (e.g., the flight time between the two APs, and the two APs' location information) to compute its differential distance with the pair of APs (e.g., that transmit the first, second, and third signals) (block 1040). The method 1001 then operates such that the STA performs the same operation with additional AP pairs to obtain its differential distance with multiple APs in order to determine its own location (block 1050).

FIG. 10B is a diagram illustrating another embodiment of a method 1002 for execution by one or more wireless communication devices. The method 1002 begins by operating a wireless communication device (e.g., STA) to receive a first signal (Beacon_m) and capture its time of arrival (ToA) t_c1 (block 1011). The method 1002 then operates such that the STA receives a second signal (e.g., ACK or NDP for Beacon_m) and capture its ToA t_c2 (block 1021). The method 1002 continues to operate such that the STA receives a third signal (Beacon_(m+1)) and processes its content to obtain t1_m and t4_m (block 1031). The method 1002 then operates such that the STA uses t_c1, t_c2, t1_m and t4_m and other parameters (e.g., the flight time between the two APs, and the two APs' location information) to compute its differential distance with the pair of APs (e.g., that transmit the first, second, and third signals) (block 1041). The method 1002 then operates such that the STA performs the same operation with additional AP pairs to obtain its differential distance with multiple APs in order to determine its own location (block 1051).

It is noted that the various operations and functions described within various methods herein may be performed within a wireless communication device (e.g., such as by the processor 330, communication interface 320, and memory 340 as described with reference to FIG. 3A) and/or other components therein. Generally, a communication interface and processor in a wireless communication device can perform such operations.

Examples of some components may include one of more baseband processing modules, one or more media access control (MAC) layer components, one or more physical layer (PHY) components, and/or other components, etc. For example, such a processor can perform baseband processing operations and can operate in conjunction with a radio, analog front end (AFE), etc. The processor can generate such signals, packets, frames, and/or equivalents etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennae. In some embodiments, such processing is performed cooperatively by a processor in a first device and another processor within a second device. In other embodiments, such processing is performed wholly by a processor within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more of its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
a communication interface; and
a processor, the processor and the communication interface configured to:
receive, at a first time of arrival, a first signal of a frame exchange procedure that is transmitted from a first other wireless communication device to a second other wireless communication device, wherein the first signal is received during a designated time interval within a beacon interval, wherein the frame exchange procedure is between the first and second other wireless communication devices;
receive, at a second time of arrival, a second signal of the frame exchange procedure that is transmitted from the second other wireless communication device to the first other wireless communication device, wherein the second signal is transmitted after the first signal is transmitted by the first other wireless communication device;
receive a third signal of the frame exchange procedure that is transmitted from the first other wireless communication device to the second other wireless communication device, wherein the third signal includes a time of departure of the first signal from the first other wireless communication device and a third time of arrival of the second signal at the first other wireless communication device;
estimate a differential distance of the wireless communication device with the first and the second other wireless communication devices based on the time of departure, the first, the second, and the third times of arrival and a time of flight between the first and second other wireless communication devices; and
estimate a location of the wireless communication device based the differential distance and additional differential distances between the wireless communication device with other pairs of wireless communication devices and location information of the first other wireless communication device, the second other wireless communication device, and the other pairs of wireless communication devices.

2. The wireless communication device of claim 1, wherein the processor and the communication interface are further configured to:
receive at least one beacon transmitted by at least one of the first or the second other wireless communication device, wherein the beacon implicitly or explicitly specifies an fine timing measurement (FTM) frame exchange procedure to occur between the first and the second other wireless communication devices or that the first, the second, and the third signals are to be during the designated time interval within the beacon interval.

3. The wireless communication device of claim 2, wherein the FTM frame exchange procedure occurs immediately after a short interframe space (SIFS) or point coordination function (PCF) interframe space (PIFS) following a beacon transmission within the beacon interval.

4. The wireless communication device of claim 1, wherein:
the first signal is a first fine timing measurement (FTM) frame and the third signal is a second FTM frame that are part of an FTM frame exchange procedure between the first and second other wireless communication devices; and
the second signal is an acknowledgement (ACK) to the first FTM frame and is also part of the FTM frame exchange procedure.

5. The wireless communication device of claim 1, wherein:
the first signal is a first fine timing measurement (FTM) frame and the third signal is a second FTM frame that are part of an FTM frame exchange procedure between the first and second other wireless communication devices; and
the second signal is a null data packet (NDP) in response to the first FTM frame and is also part of the FTM frame exchange procedure.

6. The wireless communication device of claim 1, wherein:
the first signal is a modified beacon that includes timestamps information and is part of a timestamp frame exchange procedure between the first other wireless communication device to the second other wireless communication device to provide timestamps information; and
the second signal is null data packet (NDP) in response to the modified beacon and is also part of the timestamp frame exchange procedure.

7. The wireless communication device of claim 1, wherein the processor and the communication interface are further configured to:
awaken the wireless communication device from a sleep or reduced power state at a beginning of the beacon interval; and
enter the wireless communication device to the sleep or reduced power state after the designated time interval within the beacon interval has elapsed.

8. The wireless communication device of claim 1 further comprising:
a wireless station (STA), wherein the first other wireless communication device is a first access point (AP), and the second other wireless communication device is a second access point AP.

9. A wireless communication device comprising:
a communication interface; and
a processor, the processor and the communication interface configured to:
awaken the wireless communication device from a sleep or reduced power state at a beginning of a beacon interval;
receive, at a first time of arrival, a first signal of a frame exchange procedure that is transmitted from a first other wireless communication device to a second other wireless communication device, wherein the first signal includes first timestamps information and is received during a designated time interval within the beacon interval, wherein the frame exchange procedure is between the first and second other wireless communication devices;

receive, at a second time of arrival, a second signal of the frame exchange procedure that is transmitted from the second other wireless communication device to the first other wireless communication device in response to the first signal;

receive a third signal of the frame exchange procedure that is transmitted from the first other wireless communication device to the second other wireless communication device, wherein the third signal includes second timestamps information that includes a time of departure of the first signal from the first other wireless communication device and a third time of arrival of the second signal at the first other wireless communication device;

estimate a differential distance of the wireless communication device with the first and the second other wireless communication devices based on the time of departure, the first, the second, and the third times of arrival and a time of flight between the first and second other wireless communication devices;

estimate a location of the wireless communication device based the differential distance and additional differential distances with the wireless communication device and other pairs of wireless communication devices and location information of the first other wireless communication device, the second other wireless communication device, and the other pairs of wireless communication devices; and enter the wireless communication device to the sleep or reduced power state after the designated time interval within the beacon interval has elapsed.

10. The wireless communication device of claim 9, wherein the first signal is a modified beacon that includes the first timestamps information.

11. The wireless communication device of claim 9, wherein the second signal is an acknowledgement (ACK) to the first signal.

12. The wireless communication device of claim 9, wherein the second signal is a null data packet (NDP) in response to the first signal.

13. The wireless communication device of claim 9 further comprising:
a wireless station (STA), wherein the first other wireless communication device is a first access point (AP), and the second other wireless communication device is a second access point AP.

14. A method for execution by a wireless communication device, the method comprising:
receiving, at a first time of arrival, a first signal of a frame exchange procedure that is transmitted from a first other wireless communication device to a second other wireless communication device, wherein the first signal is received during a designated time interval within a beacon interval, wherein the frame exchange procedure is between the first and second other wireless communication devices;

receiving, at a second time of arrival, a second signal of the frame exchange procedure that is transmitted from the second other wireless communication device to the first other wireless communication device, wherein the second signal is transmitted after the first signal is transmitted by the first other wireless communication device;

receiving a third signal of the frame exchange procedure that is transmitted from the first other wireless communication device to the second other wireless communication device, wherein the third signal includes a time of departure of the first signal from the first other wireless communication device and a third time of arrival of the second signal at the first other wireless communication device;

estimating a differential distance of the wireless communication device with the first and the second other wireless communication devices based on the time of departure, the first, the second, and the third times of arrival and a time of flight between the first and second other wireless communication devices; and estimating a location of the wireless communication device based the differential distance and additional differential distances between the wireless communication device and other pairs of wireless communication devices and location information of the first other wireless communication device, the second other wireless communication device, and the other pairs of wireless communication devices.

15. The method of claim 14 further comprising:
receiving at least one beacon transmitted by at least one of the first or the second other wireless communication device, wherein the beacon implicitly or explicitly specifies an fine timing measurement (FTM) frame exchange procedure to occur between the first and the second other wireless communication devices or that the first, the second, and the third signals are to be during the designated time interval within the beacon interval.

16. The method of claim 15, wherein the FTM frame exchange procedure occurs immediately after a short interframe space (SIFS) or point coordination function (PCF) interframe space (PIFS) following a beacon transmission within the beacon interval.

17. The method of claim 14, wherein:
the first signal is a first fine timing measurement (FTM) frame and the third signal is a second FTM frame that are part of an FTM frame exchange procedure between the first and second other wireless communication devices; and
the second signal is an acknowledgement (ACK) a null data packet (NDP) in response to the first FTM frame and is also part of the FTM frame exchange procedure.

18. The method of claim 14, wherein the first signal is a modified beacon that includes timestamps information and is part of a timestamp frame exchange procedure between the first other wireless communication device to the second other wireless communication device to provide timestamps information.

19. The method of claim 14 further comprising:
awakening the wireless communication device from a sleep or reduced power state at a beginning of the beacon interval; and
entering the wireless communication device to the sleep or reduced power state after the designated time interval within the beacon interval has elapsed.

20. The method of claim 14, wherein the wireless communication device is a wireless station (STA), the first other wireless communication device is a first access point (AP), and the second other wireless communication device is a second access point AP.

* * * * *